UNITED STATES PATENT OFFICE.

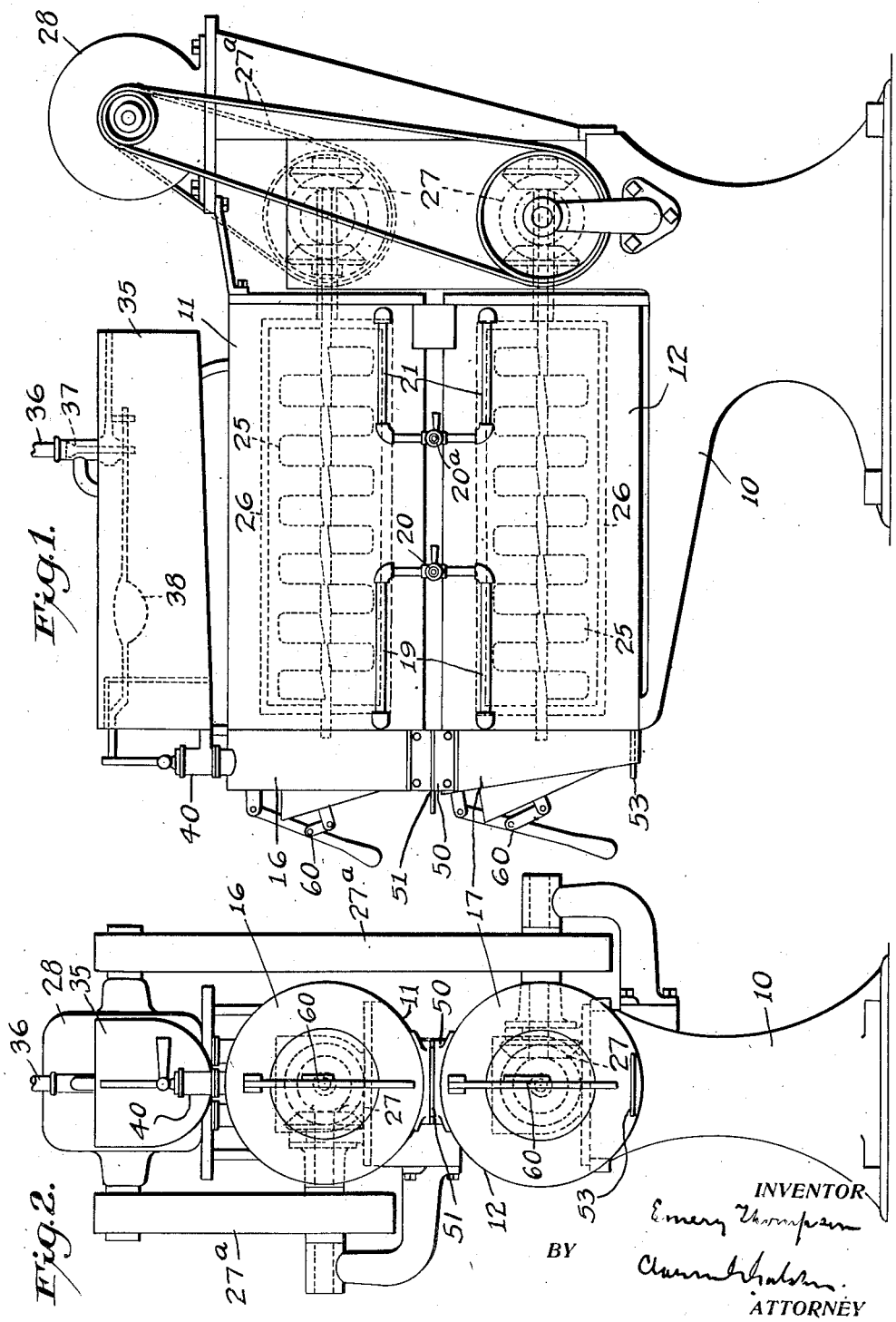

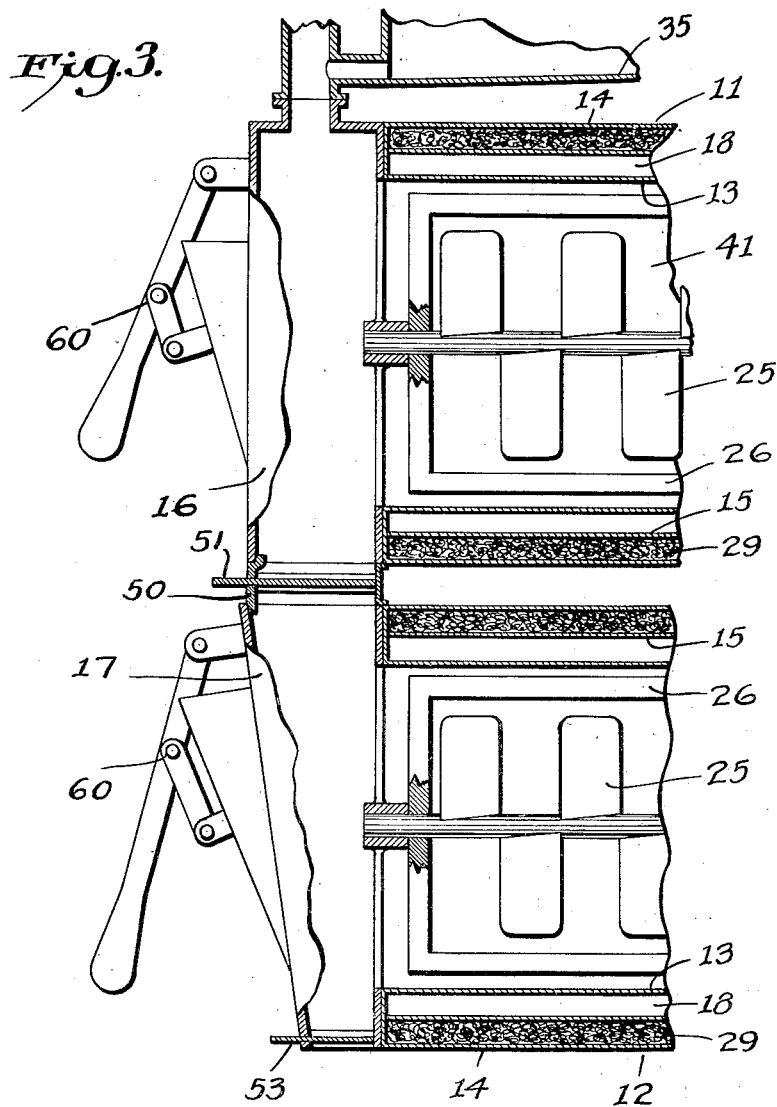

EMERY THOMPSON, OF NEW ROCHELLE, NEW YORK.

ICE-CREAM FREEZER.

1,407,044.  Specification of Letters Patent.  Patented Feb. 21, 1922.

Application filed September 24, 1921. Serial No. 503,017.

*To all whom it may concern:*

Be it known that I, EMERY THOMPSON, a citizen of the United States, and a resident of New Rochelle, in the county of Westchester and State of New York, have invented a new and Improved Ice-Cream Freezer, of which the following is a full, clear, and exact description.

The invention is a double cylinder ice-cream freezer, with agitating means in the cylinders driven by a common motor, in which the first part of the freezing of a batch of liquid cream is performed in one cylinder and the operation continued and completed in the other cylinder, the two cylinders operating simultaneously, the one upon a fresh batch of cream and the other upon the cream in the second or continuation stage of the freezing. The sweet cream is introduced into the upper cylinder and subjected to the chilling or refrigerating action, and at a suitable point in the operation a valve is opened and the material discharged into the lower cylinder, where the freezing of this batch is conducted to the usual point of completion, and from which the finished batch is discharged into packing cans. When the discharge gate of the lower cylinder is closed upon the exit of a finished batch, the communication between the cylinders is opened, so as to cause the partially worked batch from the upper cylinder to pass to the lower cylinder, whereupon the communication is closed and a fresh batch of cream is put into the top cylinder. In this way power is equalized from the low load at the beginning of the freezing to the heavy load at the stiffening or latter part of the freezing of the ice cream, thus diminishing the size of the motor relative to the output, or preventing heating of the motor due to sticking of the agitators, as occurs in ordinary single-cylinder freezers. Furthermore, it is possible to gear the first cylinder to the common motor so as to run at a slower speed than the finishing cylinder, accomplishing a result which can be obtained in a single cylinder freezer only with the added complication and expense of a variable-speed transmission mechanism. The double-cylinder machine with its double output occupies the same floor space as a single freezer, and with a group of these machines, having the same capacity as a larger group of single machines, it becomes possible to centralize the combined output, bringing it nearer to the entrance of the storage and hardening room, thus avoiding softening of the ice-cream in carriage from the freezers as compared with the case of a long line of single freezers. The operator is also enabled to increase the production by concentration of attention.

Still another advantage of the freezer is that the first part of the freezing or chilling in the top cylinder can be run on a lesser brine flow, giving the relatively liquid cream an opportunity to whip up while the lower batch is freezing and finishing on a full-brine circulation, thereby improving the quality and obtaining increased yield or overrun of the ice-cream.

A practical embodiment of the invention is represented in the accompanying drawings forming a part of this specification, in which similar characters of reference indicate corresponding parts in both views.

Fig. 1 is a side elevation of the improved ice-cream freezer with parts shown broken out; and Fig. 2 is a front end elevation of the same; and Fig. 3 is an enlarged sectional view with parts in elevation, taken through the front part of the machine.

On a suitably constructed stand 10 are mounted two freezing vessels 11 and 12 located one above the other and having their axes preferably disposed horizontally. The vessels 11 and 12 are preferably alike in construction and preferably similar to the one shown and described in the Letters Patent of the United States for an ice cream freezer, No. 1,294,571, granted to me on February 18, 1919, so that further description of the detailed construction thereof is not deemed necessary except to state that each comprises an inner shell 13, an outer shell 14, an intermediate shell 15, and rear and front heads 16 and 17 common to the three shells. The shells 13 and 15 form between them a brine circulating chamber 18 connected at one end with a supply pipe 19 having a valve 20 and connected with a pump or other means for circulating the freezing medium through the chamber 19. A return pipe 21 containing a valve 20$^a$ leads from the circulating chamber 18 for returning the freezing medium to the original supply. Common supply and return pipes are shown branched to the jackets of the two cylinders, and the valves may be, and preferably are, so constructed or arranged, in a manner which will be obvious, as to permit of different adjustments of brine flow in the two cylinders. The space between the shells 14 and 15 is preferably filled with a heat insulating material 29 to keep the circulating freezing medium in the circulating chamber 18 at as low a temperature as possible during its circulation through the chamber 18.

Within each shell 13 are mounted to turn two agitators 25 and 26, preferably driven in opposite directions by a suitable gearing 27 driven from a motor 28 mounted on the top of the stand 10 and common to the two freezing vessels. By suitable belts 27$^a$ or other gearing the agitating devices 25, 26, in the two vessels 11 and 12, are driven simultaneously from this motor. The gearing is shown for purpose of illustration proportioned to drive the agitating means of the two cylinders at equal speeds, but manifestly by selecting pulleys or gears of suitable sizes the agitators of the upper cylinder can be operated at a slower speed than those of the lower cylinder, as heretofore pointed out.

On top of the upper vessel 11 is mounted a tank or a pan 35 for containing the cream to be frozen, which is supplied to this tank by a suitable supply pipe 36 having a valve 37 controlled by a float 38. The front end of the tank 35 is connected with an outlet valve 40 under the control of the attendant of the machine, and this valve connects with the usual cream inlet in the head 17 to supply the agitating chamber 41 of the vessel 11 with the cream to be initially chilled or frozen by the combined action of the agitators and the freezing medium circulating through the chamber 18. A valved or gated cream outlet in the bottom of the head 16 of the vessel 11 is arranged to discharge into an inlet in the top of the head 17 of the vessel 12, being preferably connected therewith by a tubular connection 50. The gate or slide valve under the control of the attendant of the freezer for retaining the cream in the upper cylinder and for causing its transfer into the lower cylinder is represented in a simple manner at 51; and the gate for the bottom discharge outlet in the head of the lower cylinder is represented, for illustration, in a similar manner at 53, it being understood that any approved form of gate and operating means may be employed.

After the cream in the vessel 11 has been whipped up and chilled or frozen to some degree, the valve 51 is opened to allow this partly frozen soft ice-cream mixture to flow from the vessel 11 into the agitating chamber 41 of the vessel 12 by way of the head 16 of this vessel. The batch is now subjected to the combined action of the freezing medium and the agitator in the vessel 12 to convert the material into the usual condition in which it is discharged into cans. The ice-cream is then discharged from the lower vessel by the operator opening the valved outlet 53. The several cream valves are operated by the attendant in such manner that as soon as the valve 53 has been opened and closed to discharge a finished batch, the transfer valve 51 is opened to cause a partially worked and refrigerated batch to pass from the upper to the lower vessel, whereupon this valve is closed, and the valve 40 is opened to admit fresh liquid cream to the upper vessel. Both sections of the freezer thus operate simultaneously.

Levers 60 operate doors by which the interior of the vessels 11 and 12 may be made easily accessible for cleaning or other purposes.

The advantages of a freezer constructed and operated in the manner described have previously been pointed out. I do not necessarily limit myself to two cylinders, though more could not well be employed to practical advantage.

What I claim as new is:

1. An ice-cream freezer comprising two freezing cylinders one above the other with agitating means in each and common means for driving said agitating means, the top cylinder having a cream inlet and each cylinder being closed against egress of the material save for a bottom outlet, and valves controlling the respective bottom outlets so as to retain the material in each cylinder until a desired time of transfer and discharge, the outlet of the upper cylinder being arranged to discharge into the top of the lower cylinder.

2. An ice-cream freezer comprising two brine-jacketed freezing cylinders one above the other with agitating means in each and common means for driving said agitating means, the top cylinder having a cream inlet and each cylinder being closed against egress of the material save for a bottom outlet, and valves controlling the respective bottom outlets so as to retain the material in each cylinder until a desired time of transfer and discharge, the outlet of the upper cylinder being arranged to discharge into the top of the lower cylinder, and means for obtaining differential brine flow in the jackets of the two cylinders.

EMERY THOMPSON.